United States Patent
Zhou

(10) Patent No.: US 11,914,805 B2
(45) Date of Patent: Feb. 27, 2024

(54) TOUCH PANEL, TOUCH DISPLAY PANEL AND ATTACHING METHOD OF GLASS COVER

(71) Applicant: SHENZHEN CHINA STAR OPTOELECTRONICS SEMICONDUCTOR DISPLAY TECHNOLOGY CO., LTD., Shenzhen (CN)

(72) Inventor: Mingjun Zhou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 643 days.

(21) Appl. No.: 17/050,418

(22) PCT Filed: May 28, 2020

(86) PCT No.: PCT/CN2020/092769
§ 371 (c)(1),
(2) Date: Oct. 23, 2020

(87) PCT Pub. No.: WO2021/196387
PCT Pub. Date: Oct. 7, 2021

(65) Prior Publication Data
US 2023/0116168 A1  Apr. 13, 2023

(30) Foreign Application Priority Data

Mar. 30, 2020  (CN) .......................... 202010236385.7

(51) Int. Cl.
*G06F 3/041* (2006.01)
*B32B 37/12* (2006.01)

(52) U.S. Cl.
CPC ............ *G06F 3/0412* (2013.01); *B32B 37/12* (2013.01); *B32B 2037/1253* (2013.01);
(Continued)

(58) Field of Classification Search
CPC ......... G06F 3/0412; G06F 2203/04103; B32B 37/12; B32B 2037/1253; B32B 2310/0831; B32B 2315/08
See application file for complete search history.

(56) References Cited

FOREIGN PATENT DOCUMENTS

| CN | 104090687 A | 10/2014 |
|---|---|---|
| CN | 105353910 A | 2/2016 |

(Continued)

OTHER PUBLICATIONS

CN109407891A Machine Translation of Description. (Year: 2023).*

(Continued)

*Primary Examiner* — Cynthia L Schaller
(74) *Attorney, Agent, or Firm* — PV IP PC; Wei Te Chung; Zhigang Ma

(57) ABSTRACT

A touch panel, a touch display panel, and an attaching method of a glass cover are provided. The touch panel includes a touch control layer provided with an adhesive layer on an upper surface, and a glass cover disposed on the touch control layer and connected to the touch control layer by the adhesive layer; wherein a side of the glass cover facing the touch control layer provided with an ink layer, a plurality of meshes is disposed on the ink layer allowing ultraviolet light to pass through to irradiate and cure the adhesive layer.

18 Claims, 3 Drawing Sheets

(52) U.S. Cl.
CPC ... *B32B 2310/0831* (2013.01); *B32B 2315/08* (2013.01); *G06F 2203/04103* (2013.01)

(56) References Cited

FOREIGN PATENT DOCUMENTS

| CN | 109407891 A | | 3/2019 |
| CN | 109445645 A | * | 3/2019 |
| CN | 209590802 U | | 11/2019 |
| KR | 20070036867 A | | 4/2007 |

OTHER PUBLICATIONS

CN109445645A Machine Translation of Description. (Year: 2023).*
"Mesh" definition from Merriam-Webster On-line Dictionary (merriam-webster.com/dictionary/mesh). (Year: 2023).*
International Search Report in International application No. PCT/CN2020/092769, dated Dec. 30, 2020.
Written Opinion of the International Searching Authority in International application No. PCT/CN2020/092769, dated Dec. 30, 2020.
Chinese Office Action issued in corresponding Chinese Patent Application No. 202010236385.7 dated Mar. 2, 2021, pp. 1-7.

* cited by examiner

TOUCH PANEL, TOUCH DISPLAY PANEL AND ATTACHING METHOD OF GLASS COVER

RELATED APPLICATIONS

This application is a National Phase of PCT Patent Application No. PCT/CN2020/092769 having international filing date of May 28, 2020, which claims the benefit of priority of Chinese Patent Application No. 202010236385.7 filed on Mar. 30, 2020. The contents of the above applications are all incorporated by reference as if fully set forth herein in their entirety.

BACKGROUND

Field of Invention

The present disclosure relates to a field of display technology, and more particularly, to a touch panel, a touch display panel, and an attaching method of a glass cover.

Description of the Prior Art

A traditional attaching method of a touch display frame adopts a water-based glue, which is prone to a glue overflow problem and a difficult curing, resulting in component detachment due to poor curing. Such a method cannot ensure airtightness of a cavity space, moisture and dust can invade, affecting appearance and long-term reliability of a client terminal. Therefore, the existing technology has defects and needs to be improved urgently.

SUMMARY

A purpose of an embodiment of the present disclosure is to provide a touch panel, a touch display panel, and an attaching method of a glass cover, so that ultraviolet light can be better transmitted and irradiated on a adhesive layer, thereby making the adhesive layer be better cured and avoiding a problem of poor curing of traditional adhesive.

First, an embodiment of the present disclosure provides a touch panel, including:
  a touch control layer, provided with an adhesive layer on an upper surface;
  a glass cover, disposed on the touch control layer and connected to the touch control layer by the adhesive layer, wherein a side of the glass cover facing to the touch control layer is provided with an ink layer, and a plurality of meshes disposed on the ink layer allowing ultraviolet light to pass through to irradiate and cure the adhesive layer.

In an embodiment of the present disclosure, by disposing a plurality of meshes on the ink layer on a lower surface of the glass cover, ultraviolet light can be better transmitted and irradiated on the adhesive layer, thereby making the adhesive layer be better cured and avoiding a problem of poor curing of traditional adhesive.

In the touch panel of the present disclosure, the plurality of meshes have a circular shape or an elliptical shape.

Optionally, in the touch panel of the present disclosure, the plurality of meshes are disposed in a rectangular array and arranged evenly.

In the touch panel of the present disclosure, adjacent meshes of the plurality of meshes are spaced apart by 1 millimeter to 2 millimeters.

In the touch panel of the present disclosure, the plurality of meshes have the circular shape, and a radius of the plurality of meshes is from 0.5 millimeters to 1 millimeter.

In the touch panel of the present disclosure, the adhesive layer is optically clear adhesive (OCA).

In the touch panel of the present disclosure, the ink layer includes a plurality of ink sub-layers, the plurality of ink sub-layers having a same thickness, the plurality of ink sub-layers being sequentially stacked on a lower surface of the glass cover; each of the plurality of ink sub-layers having a plurality of sub-holes, a number of the plurality of sub-holes disposed on the plurality of ink sub-layers is same and are arranged correspondingly, and a diameter of the plurality of sub-holes gradually increases along a direction away from the glass cover, wherein the plurality of sub-holes disposed on different ink layers and disposed opposite constitutes a mesh of the plurality of meshes.

Second, the present disclosure also provides an attaching method of a glass cover. The method includes:
  disposing an adhesive layer on an upper surface of a display panel;
  disposing an ink layer on a lower surface of the glass cover, the ink layer having a plurality of meshes distributed at intervals;
  covering the glass cover on the display panel and bonding with the adhesive layer;
  irradiating the adhesive layer with ultraviolet light from a side of an upper face of the glass cover to cure the adhesive layer.

In an embodiment of the present disclosure, by disposing a plurality of meshes on the ink layer on a lower surface of the glass cover, ultraviolet light can be better transmitted and irradiated on the adhesive layer, thereby making the adhesive layer be better cured and avoiding a problem of poor curing of traditional adhesive.

In the attaching method of the glass cover of the present disclosure, adjacent meshes of the plurality of meshes are spaced apart by 1 millimeter to 2 millimeters; the plurality of meshes have a circular shape, and a radius of the plurality of meshes is from 0.5 millimeters to 1 millimeter.

In the attaching method of the glass cover of the present disclosure, an angle between the ultraviolet light and the upper face of the glass cover ranges from 80 degrees to 100 degrees.

In the attaching method of the glass cover of the present disclosure, the ink layer includes a plurality of ink sub-layers, the plurality of ink sub-layers having a same thickness, the plurality of ink sub-layers being sequentially stacked on a lower surface of the glass cover; each of the plurality of ink sub-layers having a plurality of sub-holes, a number of the plurality of sub-holes disposed on the plurality of ink sub-layers is same and are arranged correspondingly, and a diameter of the plurality of sub-holes gradually increases along a direction away from the glass cover, wherein the plurality of sub-holes disposed on different ink layers and disposed opposite constitutes a mesh of the plurality of meshes.

In the attaching method of the glass cover of the present disclosure, a distribution density of the plurality of meshes gradually increases along a direction from a central area to an edge area in the ink layer, and an ultraviolet lamp is disposed directly above the central area of the ink layer.

Third, the present disclosure further provides a touch display panel, including a display panel and a touch panel, wherein the touch panel is disposed on the display panel, and the touch panel includes:

a touch control layer, provided with an adhesive layer on an upper surface;

a glass cover, disposed on the touch control layer and connected to the touch control layer by the adhesive layer, wherein a side of the glass cover facing the touch control layer is provided with an ink layer, and a plurality of meshes disposed on the ink layer allowing ultraviolet light to pass through to irradiate and cure the adhesive layer.

In the touch display panel of the present disclosure, the plurality of meshes have a circular shape or an elliptical shape.

In the touch display panel of the present disclosure, the plurality of meshes are disposed in a rectangular array and arranged evenly.

In the touch display panel of the present disclosure, adjacent meshes of the plurality of meshes are spaced apart from 1 millimeter to 2 millimeters.

In the touch display panel of the present disclosure, the plurality of meshes have the circular shape, and a radius of the plurality of meshes is from 0.5 millimeters to 1 millimeter.

In the touch display panel of the present disclosure, the adhesive layer is an optically clear adhesive (OCA).

In the touch display panel of the present disclosure, the ink layer includes a plurality of ink sub-layers, the plurality of ink sub-layers having a same thickness, the plurality of ink sub-layers being sequentially stacked on a lower surface of the glass cover; each of the plurality of ink sub-layers having a plurality of sub-holes, a number of the plurality of sub-holes disposed on the plurality of ink sub-layers is same number and are arranged correspondingly, and a diameter of the plurality of sub-holes gradually increases along a direction away from the glass cover, wherein the plurality of sub-holes disposed on different ink layers and disposed opposite constitutes a mesh of the plurality of meshes.

In an embodiment of the present disclosure, by disposing a plurality of meshes on the ink layer on a lower surface of the glass cover, ultraviolet light can be better transmitted and irradiated on the adhesive layer, thereby making the adhesive layer be better cured and avoiding a problem of poor curing of traditional adhesive.

BRIEF DESCRIPTION OF DRAWINGS

In order to more clearly illustrate the technical solution in the present disclosure, the following will briefly illustrate the figures required in the present disclosure. It should be understood that the following figures are only some embodiments of the present disclosure, so it should not be seen as a limitation of the scope. For a person of ordinary skill in the art, without creative effort, other figures can also be obtained according to these figures.

DETAILED DESCRIPTION OF PREFERRED EMBODIMENTS

The technical solutions in the present disclosure will be described clearly and completely in conjunction with the figures in the present disclosure.

In the description of the present disclosure, it should be understood that the terms "inner" and "outer" refer to positional relationship based on the orientational or positional relationship shown in the figures or the products usually placed when used, and are merely for the convenience of describing the present disclosure and the simplified description, and do not indicate or imply that the device or component referred to has a specific orientation, and is constructed and operated in a specific orientation. Therefore, it should not be construed as limiting the disclosure. Moreover, the terms "first" and "second" are used for descriptive purposes only and are not to be construed as indicating or implying a relative importance or implicitly indicating the number of technical features indicated.

In the descriptions of the present disclosure, it should be noted that unless explicitly stated and defined otherwise, the terms "installing" and "connecting" should be construed broadly. For example, the connecting device can be fixedly connected, detachably connected, integrally connected, directly connected, indirectly connected through an intermediate medium, connected between the two elements. For a person of ordinary skill in the art, the specific meaning of the terms in the present disclosure can be understood according to specific situations.

The following description of each embodiment, with reference to the accompanying drawings, is used to exemplify specific embodiments which may be disclosure, such as "top", "bottom", "front", "back", "left", "right", "inside", "outside", "side", etc., are only used with reference to the orientation of the accompanying figures. Therefore, the used directional terms are intended to illustrate, but not to limit, the present disclosure. In the figures, those units with similar structures are marked with the same labels.

Figure 1:
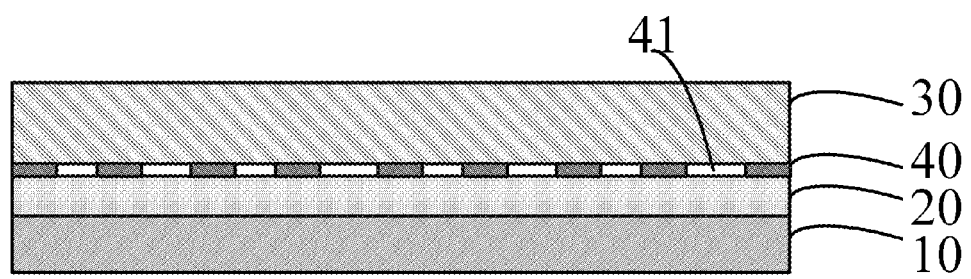
FIG. 1 is a structural schematic diagram of a touch panel according to an embodiment of the present disclosure.
Figure 2:
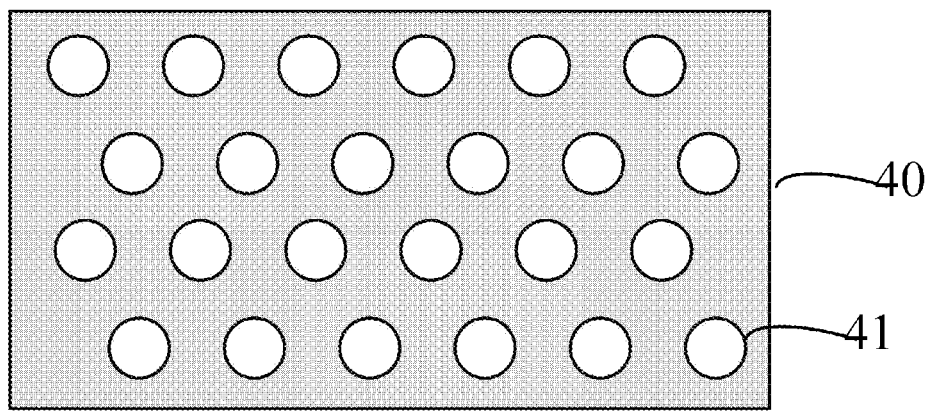
FIG. 2 is a structural schematic diagram of an ink layer of a touch panel according to an embodiment of the present disclosure.

Please refer to FIG. 1 and FIG. 2, FIG. 1 is a structural schematic diagram of a touch panel according to an embodiment of the present disclosure. FIG. 2 is a structural schematic diagram of an ink layer of the touch panel according to an embodiment of the present disclosure. The touch panel includes a touch control layer 10 and the glass cover 30. An upper surface of the touch control layer 10 is provided with an adhesive layer 20. The glass cover 30 is disposed on the touch control layer 10 and connected to the touch control layer 10 by the adhesive layer 20. A side of the glass cover 30 facing to the touch control layer 10 is provided with an ink layer 40. A plurality of meshes 41 disposed on the ink layer 40 allows ultraviolet light to pass through to irradiate and cure the adhesive layer 20.

In an embodiment of the present disclosure, by disposing a plurality of meshes on the ink layer on a lower surface of the glass cover, ultraviolet light has a better transmission rate and can irradiate an adhesive layer more effectively, thereby curing the adhesive layer more effectively, and avoiding a problem of poor curing of traditional adhesive.

According to some embodiments, the mesh 41 has a circular shape or an elliptical shape.

According to some embodiments, the plurality of meshes are disposed in a rectangular array and arranged evenly. Adjacent meshes of the plurality of meshes are spaced apart by 1 millimeter to 2 millimeters. Preferably, the plurality of meshes have the circular shape, and a radius of the plurality of meshes is from 0.5 millimeters to 1 millimeter.

Understandably, according to some embodiments, a distribution density of the plurality of the meshes 41 is uneven. Specifically, the distribution density of the meshes 41 is less in a center area of the ink layer 40, and the distribution density of the meshes 41 gradually increases along a direction from the center area to an edge area in the ink layer 40. An ultraviolet lamp is disposed directly above the central area of the ink layer 40. By setting the distribution density of the meshes 41, light flux of ultraviolet light transmitted through each area can be made substantially the same, so that the adhesive can be cured uniformly, and avoiding the adhesive peeling due to uneven curing.

Figure 5:
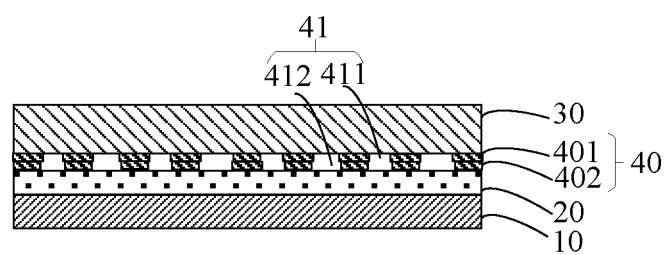
FIG. 5 is a structural schematic diagram of a touch panel according to an embodiment of the present disclosure.

Understandably, according to some embodiments, the ink layer 40 includes a plurality of ink sub-layers having a same thickness, for example, the plurality of ink sub-layers include a first ink sub-layer 401 and a second ink sub-layer 402, as shown in FIG. 5. The plurality of ink sub-layers are sequentially stacked on the lower surface of the glass cover. Each of the ink sub-layers has a plurality of sub-holes, for example, as shown in FIG. 5, the plurality of sub-holes include a plurality of first ink sub-holes 411 disposed in the first ink sub-layer 401 and a plurality of second ink sub-holes 412 disposed in the second ink sub-layer 402. A number of the plurality of sub-holes disposed in the plurality of ink sub-layers is the same and the plurality of sub-holes disposed in the plurality of ink sub-layers are arranged correspondingly, and a diameter of the plurality of sub-holes gradually increases along a direction away from the glass cover. The plurality of sub-holes disposed on different ink layers and disposed correspondingly constitute a mesh. It is convenient for ultraviolet light to pass through without affecting an overall appearance of the glass cover, and a curing efficiency and a quality of the adhesive can be improved, by making the plurality of sub-holes with increasing radii in sequence constitute the mesh 41.

In an embodiment of the present disclosure, by disposing a plurality of meshes on the ink layer on the lower surface of the glass cover, ultraviolet light has a better transmission rate and can irradiate the adhesive layer more effectively, thereby curing the adhesive layer more effectively, and avoiding a problem of poor curing of traditional adhesive.

Figure 3:
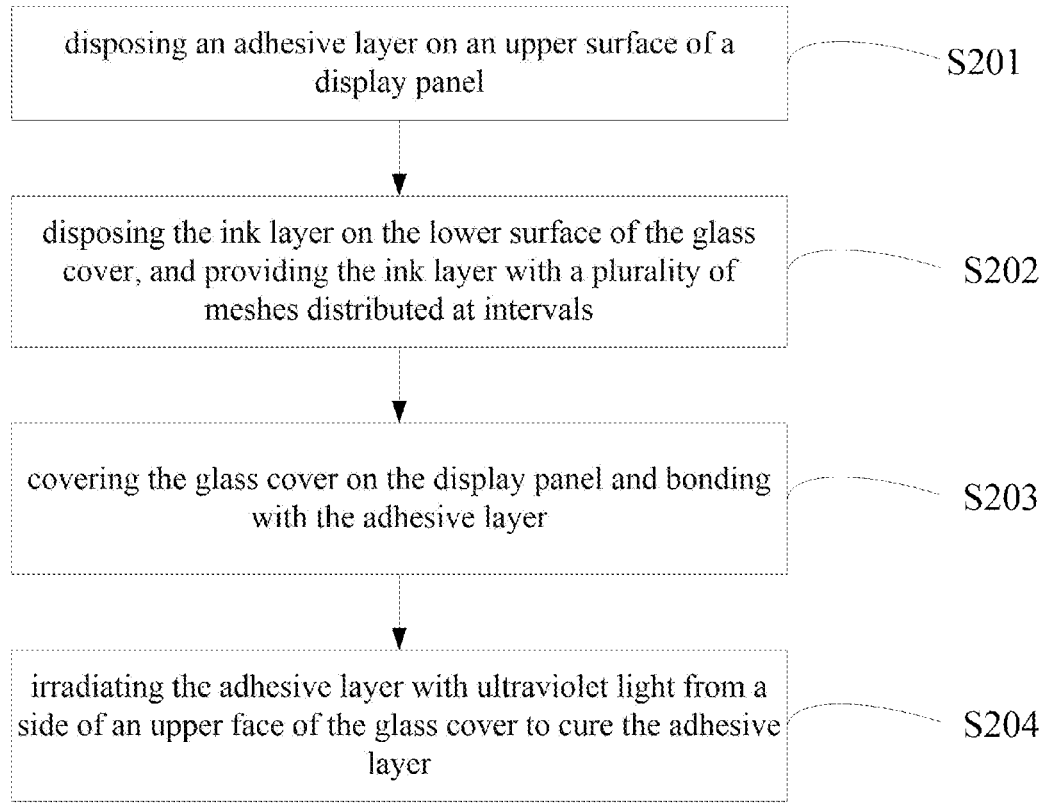
FIG. 3 is a flow schematic diagram of an attaching method of a glass cover according to an embodiment of the present disclosure.

Please refer to FIG. 3, FIG. 3 is a flow schematic diagram of an attaching method of a glass cover according to an embodiment of the present disclosure. The attaching method of the glass cover includes steps as follows:

S201, disposing an adhesive layer on an upper surface of a display panel.

S202, disposing the ink layer on the lower surface of the glass cover, and providing the ink layer with a plurality of meshes distributed at intervals.

S203, covering the glass cover on the display panel and bonding with the adhesive layer.

S204, irradiating the adhesive layer with ultraviolet light from a side of an upper face of the glass cover to cure the adhesive layer.

Optionally, in the attaching method of the glass cover according to the embodiment of the present disclosure, adjacent meshes of the plurality of meshes are spaced apart by 1 millimeter to 2 millimeters. Preferably, the plurality of meshes have the circular shape, and the radius of the plurality of meshes is from 0.5 millimeters to 1 millimeter.

Optionally, in the attaching method of the glass cover according to the embodiment of the present disclosure, an angle between the ultraviolet light and the upper face of the glass cover ranges from 80 degrees to 100 degrees.

According to some embodiments, the mesh 41 has a circular shape or an elliptical shape.

According to some embodiments, the plurality of meshes are disposed in a rectangular array and arranged evenly. Adjacent meshes of the plurality of meshes are spaced apart by 1 millimeter to 2 millimeters. Preferably, the plurality of meshes have the circular shape, and a radius of the plurality of meshes is from 0.5 millimeters to 1 millimeter.

In an embodiment of the present disclosure, by disposing a plurality of meshes on the ink layer on a lower surface of the glass cover, ultraviolet light has a better transmission rate and can irradiate the adhesive layer more effectively, thereby curing the adhesive layer more effectively, and avoiding a problem of poor curing of traditional adhesive.

Understandably, according to some embodiments, a distribution density of the plurality of the meshes 41 is uneven. Specifically, the distribution density of the meshes 41 is less on a center area of the ink layer 40, and the distribution density of the meshes 41 gradually increases along a direction from the center area to an edge area in the ink layer 40. An ultraviolet lamp is disposed directly above the central area of the ink layer 40. By setting the distribution density of the meshes 41, light flux of ultraviolet light transmitted through each area can be made substantially the same, so that the adhesive can be cured uniformly, and avoiding the adhesive peeling due to uneven curing.

Understandably, according to some embodiments, the ink layer 40 includes the plurality of ink sub-layers having a same thickness, for example, the plurality of ink sub-layers include a first ink sub-layer 401 and a second ink sub-layer 402, as shown in FIG. 5. The plurality of ink sub-layers are sequentially stacked on the lower surface of the glass cover. Each of the ink sub-layers has the plurality of sub-holes, for example, as shown in FIG. 5, the plurality of sub-holes include a plurality of first ink sub-holes 411 disposed in the first ink sub-layer 401 and a plurality of second ink sub-holes 412 disposed in the second ink sub-layer 402. A number of the plurality of sub-holes disposed in the plurality of ink sub-layers is the same and the plurality of sub-holes disposed in the plurality of ink sub-layers are arranged correspondingly, and a diameter of the plurality of sub-holes gradually increases along a direction away from the glass cover. The plurality of sub-holes disposed on different ink layers and disposed correspondingly constitute a mesh. It is convenient for ultraviolet light to pass through without affecting the overall appearance of the glass cover, and a curing efficiency and a quality of the adhesive can be improved, by making the plurality of sub-holes with increasing radii in sequence constitute the mesh 41.

Figure 4:
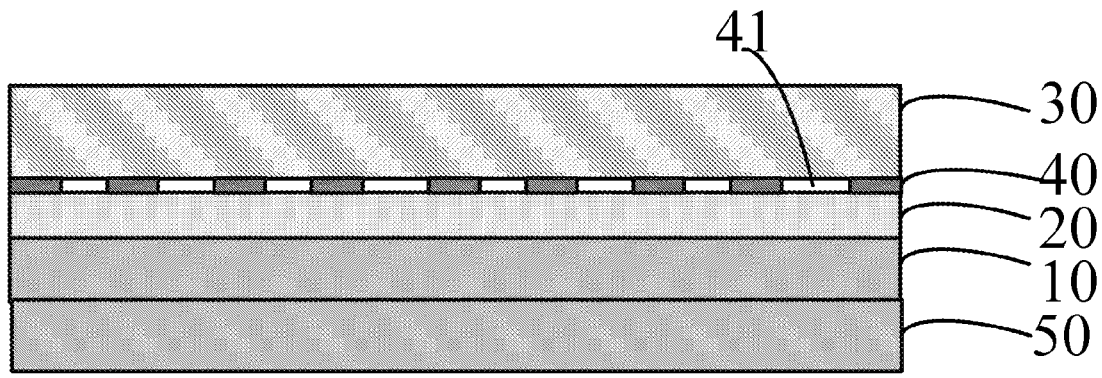
FIG. 4 is a structural schematic diagram of a touch display panel according to an embodiment of the present disclosure.

Please refer to FIG. 4, FIG. 4 is structural schematic diagram of a touch display panel according to an embodiment of the present disclosure. The touch display panel includes a display panel 50, and a touch panel disposed on the display panel 50. The touch panel is any touch panel of the above embodiments. The touch panel includes the touch control layer 10, and the glass cover 30. The touch control layer 10 is provided with an adhesive layer 20 on an upper surface. The glass cover 30 is disposed on the touch control layer 10 and connected to the touch control layer 10 by the adhesive layer 20. A side of the glass cover 30 facing to the touch control layer 10 is provided with the ink layer 40. A plurality of meshes 41 are disposed on the ink layer 40 allowing ultraviolet light to pass through to irradiate the adhesive layer 20 to cure the adhesive layer 20.

Wherein the display panel 50 can be a liquid crystal display panel. The display panel 50 can be an organic light-emitting diode (OLED) display panel or a micro light-emitting diode (micro-LED) array display panel.

In an embodiment of the present disclosure, by disposing a plurality of meshes on the ink layer on a lower surface of the glass cover, ultraviolet light can be better transmitted and irradiated on the adhesive layer, thereby making the adhesive layer be better cured and avoiding a problem of poor curing of traditional adhesive.

The above are only embodiments of the present disclosure, and are not used to limit the protection scope of the present disclosure. For a person of ordinary skill in the art, the present disclosure can have various modifications and changes. Any modification, equivalent replacement, improvement, etc. within the spirit and principle of this disclosure should be included in the scope of protection of this disclosure.

What is claimed is:

1. A touch panel, comprising:
   a touch control layer, provided with an adhesive layer on an upper surface; and
   a glass cover, disposed on the touch control layer and connected to the touch control layer by the adhesive layer, wherein a side of the glass cover facing the touch control layer is provided with an ink layer, and a plurality of mesh holes are disposed in the ink layer to allow ultraviolet light to pass through to irradiate and cure the adhesive layer,
   wherein the ink layer comprises a plurality of ink sub-layers having a same thickness, the plurality of ink sub-layers are sequentially stacked on a lower surface of the glass cover; and each of the plurality of ink sub-layers has a plurality of sub-holes, a number of the plurality of sub-holes disposed in the plurality of ink sub-layers is a same, the plurality of sub-holes disposed in the plurality of ink sub-layers are arranged correspondingly, and a diameter of the plurality of sub-holes gradually increases along a direction away from the glass cover, and
   wherein a plurality of sub-holes disposed on different ink layers and disposed correspondingly constitute a corresponding mesh hole of the plurality of mesh holes.

2. The touch panel as claimed in claim 1, wherein each of the plurality of mesh holes has a circular shape or an elliptical shape.

3. The touch panel as claimed in claim 1, wherein the plurality of mesh holes are disposed in a rectangular array.

4. The touch panel as claimed in claim 2, wherein adjacent mesh holes of the plurality of mesh holes are spaced apart by 1 millimeter to 2 millimeters.

5. The touch panel as claimed in claim 4, wherein each of the plurality of mesh holes has the circular shape, and a radius of each of the plurality of mesh holes ranges from 0.5 millimeters to 1 millimeter.

6. The touch panel as claimed in claim 1, wherein the adhesive layer is an optically clear adhesive (OCA).

7. The touch panel as claimed in claim 1, wherein a distribution density of the plurality of mesh holes gradually increases along a direction from a central area to an edge area in the ink layer.

8. An attaching method of a glass cover, comprising following steps:
   disposing an adhesive layer on an upper surface of a display panel;
   disposing an ink layer on a lower surface of the glass cover, the ink layer having a plurality of mesh holes distributed at intervals;
   covering the glass cover on the display panel; and
   irradiating the adhesive layer with ultraviolet light from a side of an upper face of the glass cover to cure the adhesive layer and make the glass cover and the display panel bond to each other,
   wherein the ink layer comprises a plurality of ink sub-layers having a same thickness, the plurality of ink sub-layers are sequentially stacked on a lower surface of the glass cover; and each of the plurality of ink sub-layers has a plurality of sub-holes, a number of the plurality of sub-holes disposed in the plurality of ink sub-layers is a same, the plurality of sub-holes disposed in the plurality of ink sub-layers are arranged correspondingly, and a diameter of the plurality of sub-holes gradually increases along a direction away from the glass cover, and
   wherein a plurality of sub-holes disposed on different ink layers and disposed correspondingly constitute a corresponding mesh hole of the plurality of mesh holes.

9. The attaching method of the glass cover as claimed in claim 8, wherein adjacent mesh holes of the plurality of mesh holes are spaced apart by 1 millimeter to 2 millimeters; and
   each of the plurality of mesh holes has a circular shape, and a radius of each of the plurality of mesh holes ranges from 0.5 millimeters to 1 millimeter.

10. The attaching method of the glass cover as claimed in claim 8, wherein an angle between the ultraviolet light and the upper face of the glass cover ranges from 80 degrees to 100 degrees.

11. The attaching method of the glass cover as claimed in claim 8, wherein a distribution density of the plurality of mesh holes gradually increases along a direction from a central area to an edge area in the ink layer, and an ultraviolet lamp is disposed directly above the central area of the ink layer.

12. A touch display panel, comprising a display panel and a touch panel, wherein the touch panel is disposed on the display panel, and the touch panel comprises:
   a touch control layer, provided with an adhesive layer on an upper surface;
   a glass cover, disposed on the touch control layer and connected to the touch control layer by the adhesive layer, wherein a side of the glass cover facing the touch control layer is provided with an ink layer, and a plurality of mesh holes are disposed in the ink layer to allow ultraviolet light to pass through to irradiate and cure the adhesive layer,
   wherein the ink layer comprises a plurality of ink sub-layers having a same thickness, the plurality of ink sub-layers are sequentially stacked on a lower surface of the glass cover; and each of the plurality of ink sub-layers has a plurality of sub-holes, a number of the plurality of sub-holes disposed in the plurality of ink sub-layers is a same, the plurality of sub-holes disposed in the plurality of ink sub-layers are arranged correspondingly, and a diameter of the plurality of sub-holes gradually increases along a direction away from the glass cover, and
   wherein a plurality of sub-holes disposed on different ink layers and disposed correspondingly constitute a corresponding mesh hole of the plurality of mesh holes.

13. The touch display panel as claimed in claim 12, wherein each of the plurality of mesh holes has a circular shape or an elliptical shape.

14. The touch display panel as claimed in claim 12, wherein the plurality of mesh holes are disposed in a rectangular array.

15. The touch display panel as claimed in claim 13, wherein adjacent mesh holes of the plurality of mesh holes are spaced apart from 1 millimeter to 2 millimeters.

16. The touch display panel as claimed in claim 15, wherein each of the plurality of mesh holes has the circular shape, and a radius of each of the plurality of mesh holes ranges from 0.5 millimeters to 1 millimeter.

17. The touch display panel as claimed in claim 12, wherein the adhesive layer is an optically clear adhesive (OCA).

18. The touch display panel as claimed in claim 12, wherein a distribution density of the plurality of mesh holes gradually increases along a direction from a central area to an edge area in the ink layer.

\* \* \* \* \*